United States Patent
Weger et al.

(10) Patent No.: US 9,074,715 B2
(45) Date of Patent: Jul. 7, 2015

(54) CUSHION INSERT FOR A TUBING CLAMP AND METHOD OF REPLACEMENT

(71) Applicant: ZSI, Inc., Canton, MI (US)

(72) Inventors: Kris Weger, Plymouth, MI (US); Marc Craig, Brighton, MI (US)

(73) Assignee: ZSI, Inc., Canton, MI (US)

( * ) Notice: Subject to any disclaimer, the term of this patent is extended or adjusted under 35 U.S.C. 154(b) by 113 days.

(21) Appl. No.: 13/832,855

(22) Filed: Mar. 15, 2013

(65) Prior Publication Data

US 2014/0265076 A1    Sep. 18, 2014

(51) Int. Cl.
| | |
|---|---|
| B60G 21/055 | (2006.01) |
| F16L 55/02 | (2006.01) |
| F16L 3/12 | (2006.01) |

(52) U.S. Cl.
CPC . *F16L 55/02* (2013.01); *F16L 3/12* (2013.01); *Y10T 29/4973* (2015.01); *B60G 2204/1222* (2013.01); *B60G 2204/41* (2013.01); *B60G 21/0551* (2013.01)

(58) Field of Classification Search
CPC .................. B60G 20/0551; B60G 2204/1222; B60G 2204/41
USPC ........... 267/141, 140.3, 140.4, 292, 293, 258; 280/124.13, 124.144, 124.152; 248/74.1, 74.3
See application file for complete search history.

(56) References Cited

U.S. PATENT DOCUMENTS

| | | | |
|---|---|---|---|
| 4,516,296 A | | 5/1985 | Sherman |
| 4,880,318 A | * | 11/1989 | Shibahara et al. ............ 384/125 |
| 4,934,635 A | | 6/1990 | Sherman |
| 4,997,148 A | | 3/1991 | Sherman |
| 5,014,940 A | | 5/1991 | Sherman |
| 5,215,281 A | | 6/1993 | Sherman |
| 5,290,018 A | * | 3/1994 | Watanabe et al. ............. 267/293 |
| D408,727 S | | 4/1999 | Sherman |
| 5,984,283 A | * | 11/1999 | Tsuiki et al. .................... 267/33 |
| D424,922 S | | 5/2000 | Sherman et al. |
| 6,241,225 B1 | * | 6/2001 | Krause .......................... 267/292 |
| 6,513,801 B1 | * | 2/2003 | McCarthy ..................... 267/293 |
| 6,536,594 B2 | * | 3/2003 | Hayashi ......................... 267/33 |
| 6,971,640 B2 | * | 12/2005 | Joseph ........................... 267/141 |
| 7,179,010 B2 | | 2/2007 | Weger et al. |
| 7,341,245 B2 | * | 3/2008 | Joseph ........................... 267/141 |
| D631,739 S | | 2/2011 | Craig et al. |
| 8,292,312 B2 | * | 10/2012 | Kato et al. ............. 280/124.107 |
| D679,177 S | | 4/2013 | Craig et al. |
| 8,505,940 B1 | * | 8/2013 | Hufnagle et al. ........ 280/124.13 |
| 8,672,303 B2 | * | 3/2014 | Akagawa et al. ........ 267/140.11 |
| 2011/0031664 A1 | * | 2/2011 | Nakamura et al. ............ 267/141 |
| 2011/0272870 A1 | * | 11/2011 | Akagawa et al. ............. 267/141 |

* cited by examiner

*Primary Examiner* — Thomas Irvin

(74) *Attorney, Agent, or Firm* — Harness, Dickey & Pierce, P.L.C.

(57) ABSTRACT

A cushion insert includes a body having a slot. A first cushion half and a second cushion half extend in an arc in opposite directions from the slot and have ends spaced apart to form a gap in a location opposite the slot. A passageway extends axially through the cushion insert and is defined by the first cushion half and the second cushion half. A spacer extends axially along a top of the body and has a passage. A tab extends axially along a bottom of the body.

19 Claims, 6 Drawing Sheets

_US 9,074,715 B2_

CUSHION INSERT FOR A TUBING CLAMP AND METHOD OF REPLACEMENT

FIELD

The present disclosure relates generally to a cushion insert for a clamp for securing elongated cylindrical members. More specifically, the disclosure relates to a cushion insert for securing an elongated cylindrical member in a clamp assembly.

BACKGROUND

This section provides background information related to the present disclosure which is not necessarily prior art.

Pipe, conduit, tubing, or hose clamps (generally referred to as tubing clamps), are used to secure elongated sections of pipe, conduit, tubing, or hose to a support structure.

An example of a prior art clamp assembly is disclosed in U.S. Pat. No. 4,516,296, issued May 14, 1985, by inventor Clarence A. Sherman, which is incorporated herein by reference. The patented clamp assembly includes a cushion insert for indirectly engaging the tubing through the elastomeric cushion insert which particularly encircles the tubing and is retained within the clamp assembly as illustrated in FIG. 1.

Cushions for clamp assemblies can deteriorate after a number of years of use, and there is a need to be able to efficiently replace cushions currently in use by customers. Cushions disclosed in prior art cannot easily replace cushions currently in use. Tubing of the type that is paired to a support structure by a cushioned clamp assembly is typically substantially fixed in spatial relation to the support structure. This is due to other clamp assemblies that secure the tubing to adjacent support structures or other structural features of the environment in which the tubing is located. If the need arises to replace the cushion portion of any particular clamp assembly, the clamp halves must be removed and the cushion must be cut or otherwise extracted from the existing tubing and support structure. A new or replacement cushion must be placed around the tubing that is in the fixed spatial relationship to the support structure. The configurations or arrangements of prior known cushions make it impractical to use them as the replacement cushion in such instances.

Accordingly, there is a need for improvements to the design of cushions for tubing clamp assemblies that are capable of replacing worn out cushions without changing the spatial relationship of the tubing and the support structure.

SUMMARY

This section provides a general summary of the disclosure, and is not a comprehensive disclosure of its full scope or all of its features.

In one form, a cushion insert includes a body having a slot. A first cushion half and a second cushion half extend in an arc in opposite directions from the slot and have ends spaced apart to form a gap in a location opposite the slot. A passageway extends axially through the cushion insert and is defined by the first cushion half and the second cushion half. A spacer extends axially along a top of the body and has a passage. A tab extends axially along a bottom of the body.

In another form, a cushion insert adapted to be disposed in a clamp assembly and supported on a channel for securing cylindrical member includes a first cushion half and a second cushion half being adapted to jointly encircle the cylindrical member. The first cushion half and second cushion half have ends spaced apart to form a gap. A passageway extends axially through the cushion insert and is defined by the first cushion half and the second cushion half. A groove extends axially along the side of the passageway opposite the gap and divides the first cushion half and the second cushion half. A spacer extends axially along a top of the body and is adapted to prevent excessive tightening of the first and second clamp halves of the clamp assembly around the cylindrical member. A tab extends axially along a bottom of the body and is adapted to locate a position of the cushion insert relative to the channel.

A method for replacing a cushion insert adapted to be disposed on a support channel and about a cylindrical member includes removing an old cushion insert from about the cylindrical member. A first cushion half and a second cushion half of a new cushion are expanded to allow the new cushion to be placed on the cylindrical member and the first and second halves of the new cushion are allowed to retract and wrap around the cylindrical member. The new cushion insert is axially rotated around the cylindrical member until a bottom of the cushion insert is aligned on the channel and a spacer of the new cushion is aligned with a first and second clamp half of a clamp assembly. A fastener is fed through a passage in the first and second clamp halves and the spacer to properly locate the new cushion insert relative to the first and second clamp halves that surround the cushion and secure the tubing to the support channel. The fastener is tightened such that the first and second clamp halves exert force on the cylindrical member through the cushion insert thereby preventing axial and rotational movement and vibration of the cylindrical member in relation to the cushion insert and the support channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
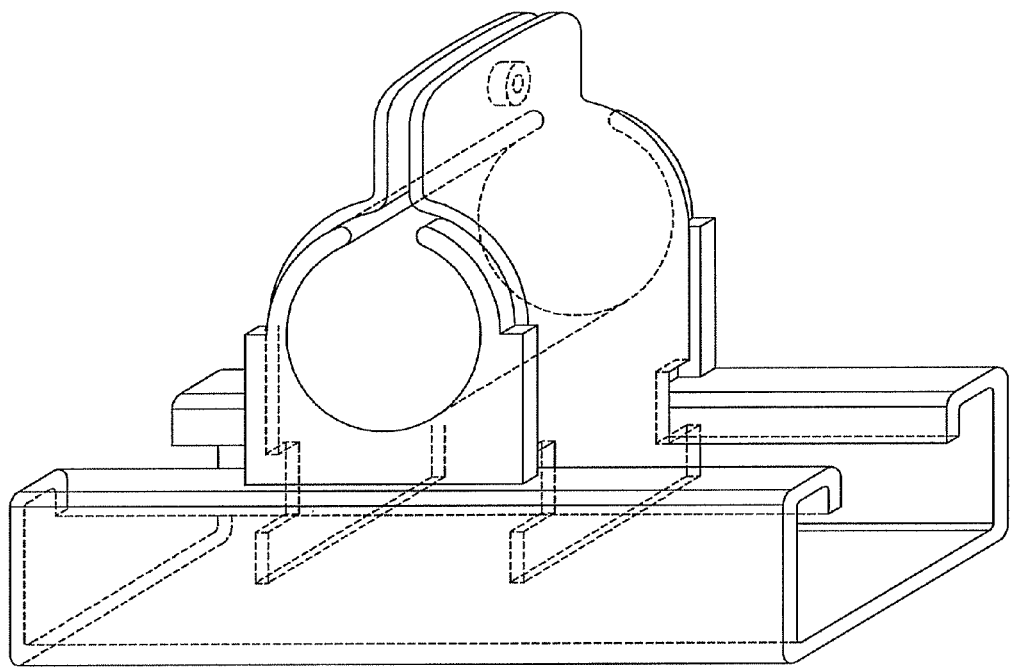
FIG. 1 is a perspective view of a prior art cushion insert in a tube clamp assembly.
Figure 2:
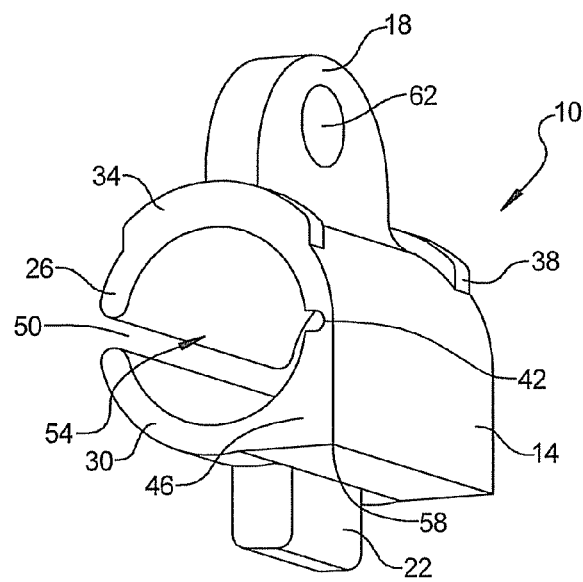
FIG. 2 is a perspective view of a cushion insert according to the principles of the present disclosure.
Figure 3:
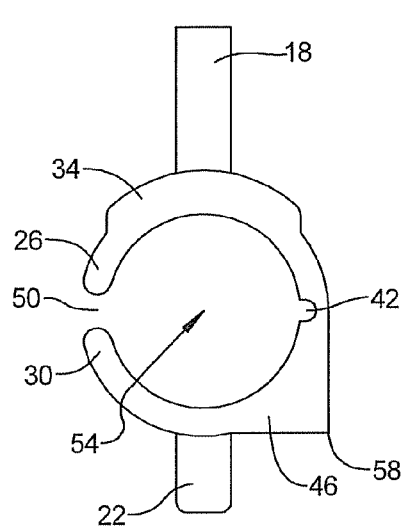
FIG. 3 is a front view of the cushion insert shown in FIG. 2.
Figure 4:
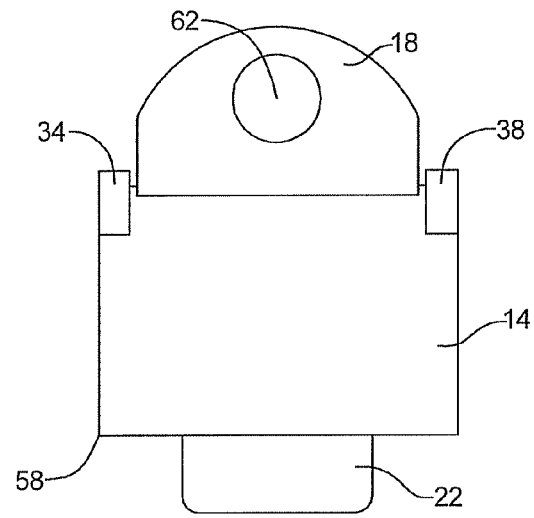
FIG. 4 is a side view of a first side of the cushion insert shown in FIG. 2.
Figure 5:
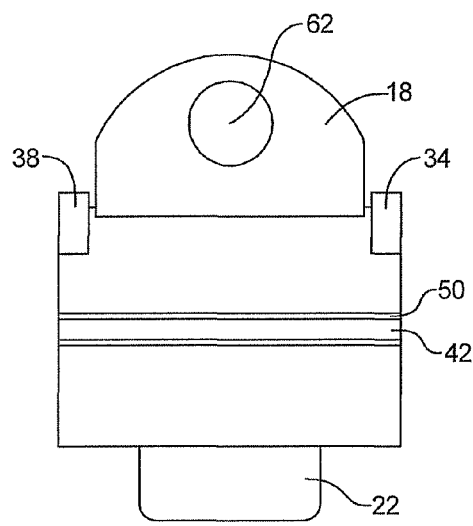
FIG. 5 is a side view of a second side of the cushion insert shown in FIG. 2.
Figure 6:
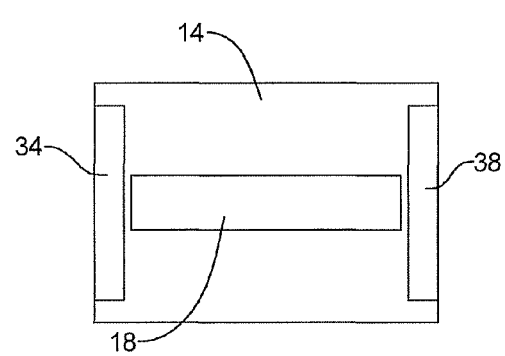
FIG. 6 is a top view of the cushion insert shown in FIG. 2.
Figure 7:
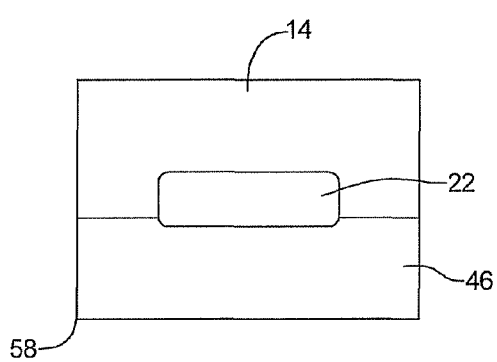
FIG. 7 is a bottom view of the cushion insert shown in FIG. 2.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the accompanying figures, example embodiments of a cushion insert 10 according to the principles of the present disclosure will now be described. The cushion insert 10 may cushion a tube or cylindrical member that is supported on a support channel or strut in a substantially fixed spatial relationship, as described herein.

Referring now to FIGS. 2-8, cushion insert 10 includes a body 14, a spacer 18, and a tab 22. The cushion insert 10 may be of an elastomeric material, such as a thermoplastic elastomer, to provide cushion and support of the tube, or other elongated member, on the channel and to allow the cushion insert 10 to be molded by conventional injection molding.

The body 14 further includes first and second cushion halves 26, 30, a first and second end flange 34, 38, a slot 42, and a base portion 46. The first and second cushion halves 26, 30 extend in an arc from the slot 42. The ends of the first and second cushion halves 26, 30 form a space or gap 50 that allows the first and second cushion halves 26, 30 to be partially flexed to fit over a tube, conduit, or fitting (not shown in the figure) in a passageway 54 defined by the first and second cushion halves 26, 30. The passageway 54 extends axially through the cushion insert 10.

The slot 42 is formed axially along the side of the passageway 54, opposite the gap 50. The slot 42 acts as a living hinge and allows additional flexing of the first and second cushion halves 26, 30, permitting them to be temporarily spread apart so the cushion insert can be placed over the tube, conduit, or fitting and then retract or rebound to enclose the tube, conduit, or fitting. This makes installation faster and easier, saving money in labor time.

The first and second end flanges 34, 38 may be located at the ends of the body 14 on the first cushion half 26 and may extend outwardly from the body 14. The first and second end flanges 34, 38 limit relative axial movement between the cushion insert 10 and a pair of tube clamp halves of a clamp assembly (to be described) disposed between the first and second end flanges 34, 38.

The base portion 46 includes a planar portion defining a single corner 58 to assist in locating the cushion insert 10 on the channel or other support surface within the tube clamp assembly without hindering rotation of the cushion insert 10 around an axis through the center of the passageway 54 during installation of the cushion insert 10 on the tube.

The tab 22 further assists the base portion 46 in locating the cushion insert 10 within the tube clamp assembly and/or the support channel. The tab 22 is located axially along the exterior of the base portion 46 and extends outwardly from the body 14. The interface between the tab 22 and the support channel or tube clamp assembly will be subsequently described.

Figure 10:
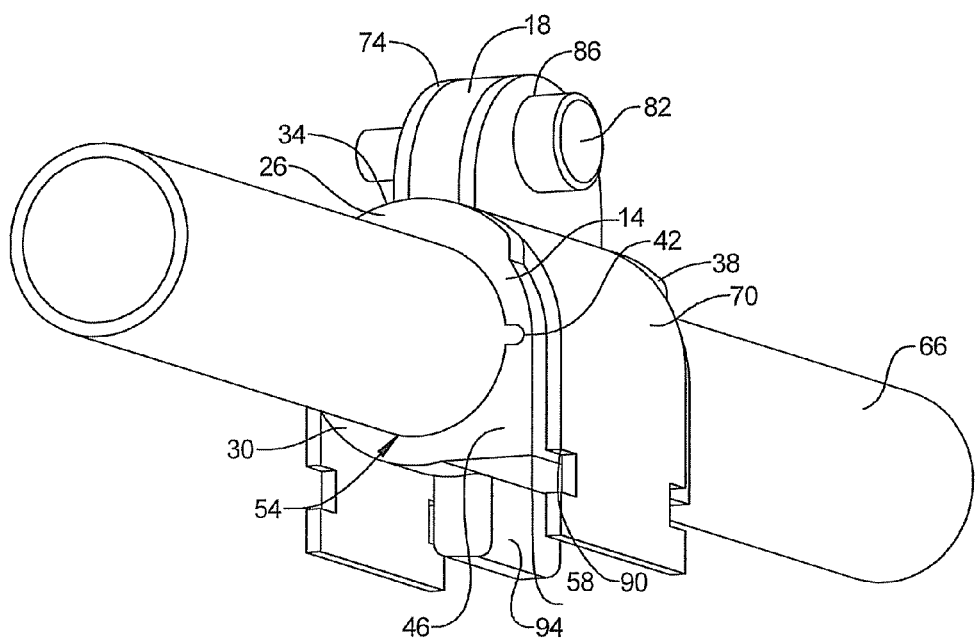
FIG. 10 is a perspective view of the cushion insert shown in FIG. 9 in the operative position with respect to a tube and first and second clamp halves of a clamp assembly (but without the support channel)

The spacer 18 assists in both locating the cushion insert 10 on the support channel and prevents the tube clamp assembly from being excessively tightened leading to damage to the tube clamp assembly or tubing. The spacer 18 may extend axially along the top of the body 14 between the first and second end flanges 34, 38. The spacer 18 may be of an arc shape and include a fastener or bolt passage 62. The bolt passage 62 aligns with bolt passages through clamp halves (FIG. 10) to mechanically locate the cushion relative to the clamp halves and clamp cushion insert 10 around the cylindrical member and to the support structure (FIG. 10). Although a bolt is discussed in the present disclosure, any fastener known in the art may be used.

Figure 8:
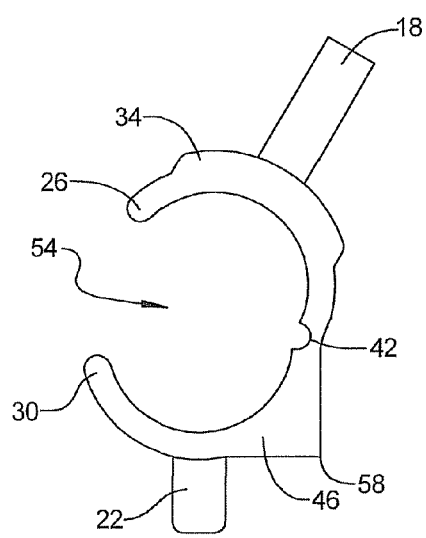
FIG. 8 is a front view of the cushion insert shown in FIG. 2 with a first cushion half and a second cushion half spread apart.
Figure 9:
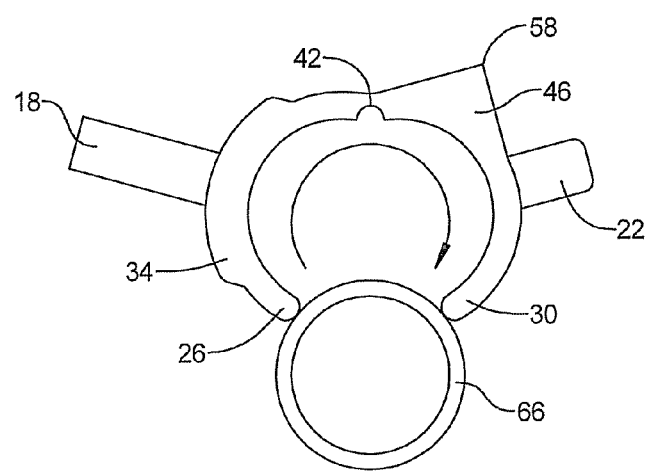
FIG. 9 is a front view of the cushion insert shown in FIG. 2 being assembled onto a tube.
Figure 11:
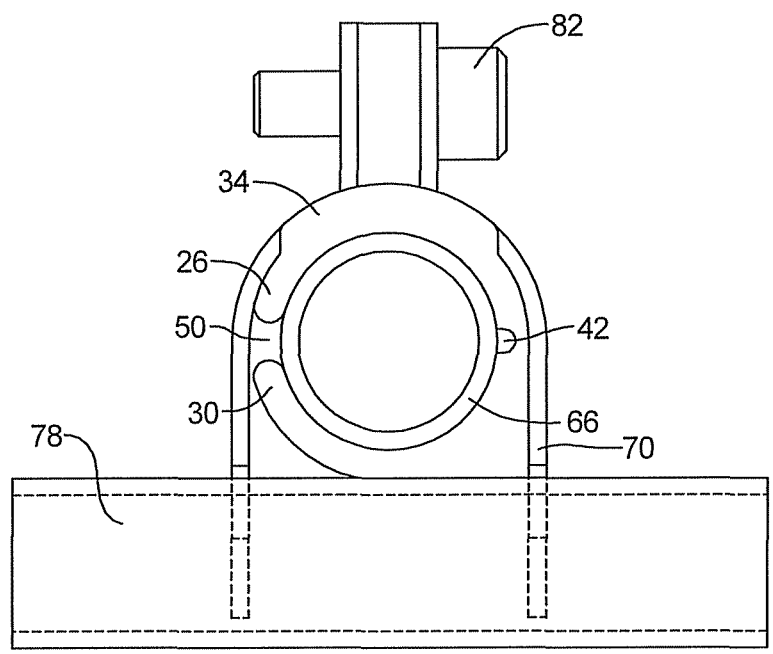
FIG. 11 is a front view of the cushion insert shown in FIG. 10 in the operative position with the support channel included.

Now referring to FIGS. 9-11, the cushion insert 10 is installed on a cylindrical member or tube 66 and located between a pair of clamp halves 70, 74 that are adapted to be disposed within a support channel 78. To install the cushion insert 10, the installer begins by removing the old cushion insert (not shown) by any means known in the art (for example only, it may be cut off of the cylindrical member). Referring specifically to FIG. 9, the installer, holding the cushion insert 10 horizontally can utilize the tab 22 and the spacer 18 to temporarily expand the first and second cushion halves 26, 30. The cushion insert 10 is placed over the cylindrical member 66, and the first and second cushion halves 26, 30 are allowed to retract and wrap around the cylindrical member 66. Once the cushion insert 10 is on the cylindrical member 66, the installer axially rotates the cushion insert 10 around the cylindrical member 66 until the base portion 46 of the cushion insert 10 is aligned on the channel and the spacer 18 and tab 22 of the cushion insert 10 are aligned with the first and second clamp halves 70, 74. Such rotation of the cushion insert 10 within the substantially fixed spatial relationship of the cylindrical member 66 to the support channel 78 is facilitated by the configuration of the cushion insert 10. In particular, the base portion 46 is located between the tab 22 and a corner 58 situated at the lower right side of the cushion insert 10 as it is depicted in FIG. 8. The base portion 46 does not extend under second cushion half 30 between the tab 22 and the open end of second cushion half 30.

Referring specifically to FIGS. 10-11, a fastener 82 is fed through an opening 86 in a first clamp half 70, through the bolt passage 62 in the spacer 18 and through a comparable opening in a second clamp half 74. The fastener 82 is tightened to create a mechanical connection between the first and second clamp halves 70, 74 and spacer 18 such that the first and second clamp halves 70, 74 exert force on the cylindrical member 66 through the cushion insert 10 preventing axial and rotational movement and vibration of the cylindrical member 66 in relation to the cushion insert 10 and the channel 78. The spacer 18 prevents excessive tightening leading to damage to the clamp halves 70, 74, the support channel 78, or the cylindrical member 66.

When installed, the first and second end flanges 34, 38 are adjacent to the first and second clamp halves 70, 74 and prevent axial movement of the cushion insert 10 relative to the first and second clamp halves 70, 74. Further, the base 46 and the corner 58 of the cushion insert 10 are aligned on the channel or support structure 78, and the tab 22 of the cushion insert 10 are aligned within the channel or support structure 78.

Figure 12:
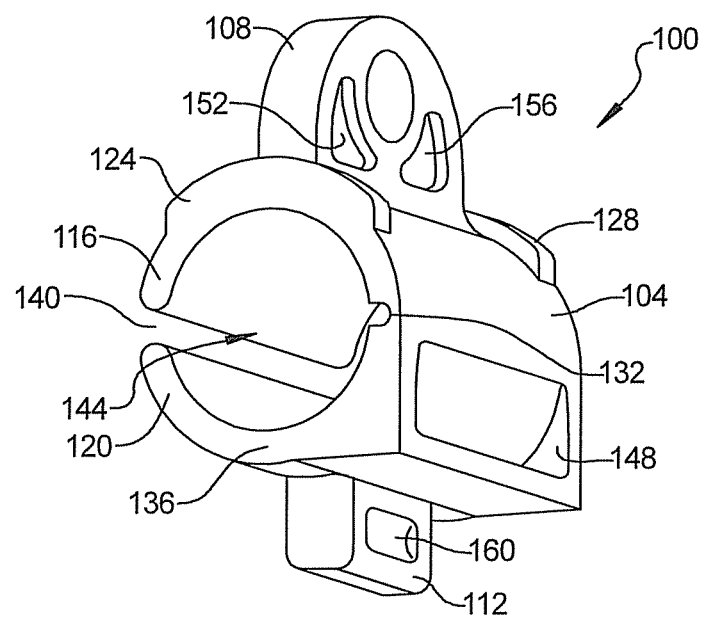
FIG. 12 is a perspective view of an alternate cushion insert according to the principles of the present disclosure.
Figure 13:
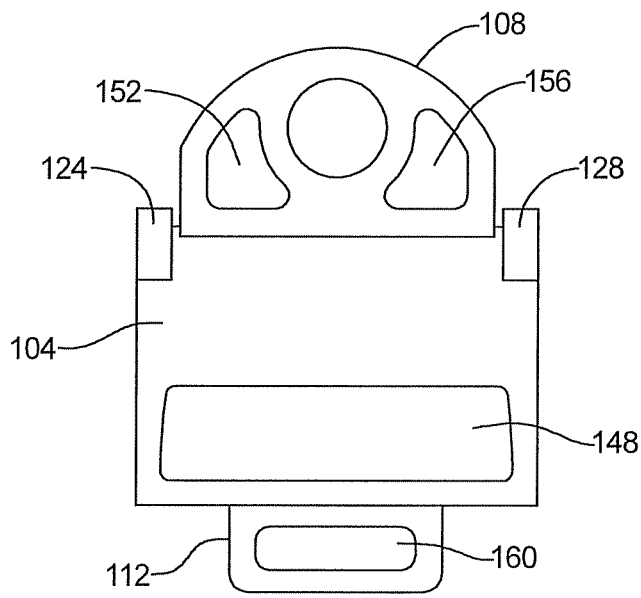
FIG. 13 is a side view of the cushion insert shown in FIG. 12.

Now referring to FIGS. 12 and 13, an alternative embodiment of a cushion insert 100 is illustrated. The cushion insert 100 may include the same features and functionality discussed in cushion insert 10. The cushion insert 100 includes a body 104, a spacer 108, and a tab 112. The cushion insert 100 may also be of an elastomeric material, such as a thermoplastic elastomer. The body 104 further includes first and second cushion halves 116, 120, a first and second end flange 124, 128, a slot 132, and a base portion 136.

A gap 140 may be formed by first and second cushion halves 116, 120 allowing the first and second cushion halves 116, 120 to be partially flexed to fit over a tube, conduit, or fitting (not shown in the figure) in a passageway 144 defined by the first and second cushion halves 116, 120. The passageway 144 extends axially through the cushion insert 100.

The cushion insert 100 may additionally include a first portion 148 on the body 104, second and third portions 152, 156, on the spacer 108, and a fourth portion 160 on the tab 112. Each of the first, second, third, and fourth portions 148, 152, 156, 160 may be recesses in the body 104, spacer 108, and/or tab 112 designed to control sink areas during the molding process and reduce material usage and cost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tubing clamp assembly for securing a cylindrical member to a channel, the tubing clamp assembly comprising:
   a first clamp half and a second clamp half that oppose one another and that are disposed at least partially about the cylindrical member;
   a cushion insert disposed between the cylindrical member and the first and second clamp halves, the cushion insert including a body having a slot, the body of the cushion insert including a first cushion half and a second cushion half that each extend in an arc in opposite directions from the slot, wherein the first cushion half and second cushion half have ends spaced apart to form a gap in a location opposite the slot;
   a passageway extending axially through the cushion insert that is defined by the first cushion half and the second cushion half and that supports the cylindrical member;
   a spacer integral with the body of the cushion insert that extends between the first clamp half and the second clamp half to prevent over-tightening of the first and second clamp halves around the cylindrical member, wherein the spacer extends outwardly from the first cushion half of the cushion insert and abuts the first and second clamp halves to limit movement of the cushion insert relative to the first and second clamp halves; and
   a tab extending axially along the second cushion half and outwardly into the channel to limit movement of the cushion insert relative to the channel.

2. The tubing clamp assembly of claim 1, wherein the slot is formed axially along the side of the passageway.

3. The tubing clamp assembly of claim 1, wherein the cushion insert and the spacer are both made of an elastomeric material.

4. The tubing clamp assembly of claim 1, further comprising first and second end flanges formed on opposite ends of the body of the cushion insert that flank the first and second clamp halves and prevent axial movement of the cushion insert relative to the first and second clamp halves.

5. The tubing clamp assembly of claim 1, wherein the cushion insert and the spacer are formed as a single piece by an injection molding process.

6. The tubing clamp assembly of claim 1, further comprising a planar base portion that locates the cushion insert rotationally relative to the channel.

7. The tubing clamp assembly of claim 6, wherein the cushion insert has a single corner where the planar base portion ends, the single corner being disposed along the second cushion half adjacent the slot and opposite the gap to assist in locating the cushion insert relative to the channel without hindering rotation of the cushion insert about the cylindrical member.

8. The tubing clamp assembly of claim 1, further comprising a passage that extends through the first clamp half, the spacer, and the second clamp half and that receives a fastener for securing the first clamp half to the second clamp half around the cushion insert and the cylindrical member.

9. The tubing clamp assembly of claim 8, wherein the spacer prevents the first clamp half and the second clamp half from being clamped by the fastener beyond a threshold.

10. The tubing clamp assembly of claim 1, further comprising a recess in at least one of the spacer, body, and tab.

11. A cushion insert adapted to be disposed in a clamp assembly that has first and second clamp halves supported on a channel for securing a cylindrical member, comprising:
a first cushion half and a second cushion half being adapted to jointly encircle the cylindrical member, wherein the first cushion half and second cushion half have ends spaced apart to form a gap;
a passageway extending axially through the cushion insert that is defined by the first cushion half and the second cushion half and that supports the cylindrical member;
a groove extending axially along the side of the passageway opposite the gap and dividing the first cushion half and the second cushion half;
a spacer integral with the first and second cushion halves that extends axially along a top of the first cushion half and between the first clamp half and the second clamp half to prevent excessive tightening of the first and second clamp halves of the clamp assembly around the cylindrical member, wherein the spacer extends outwardly from the first cushion half and abuts the first and second clamp halves to limit movement of the first and second cushion halves relative to the first and second clamp halves; and
a tab extending axially along a bottom of the body and being adapted to locate a rotational position of the cushion insert relative to the channel.

12. The cushion insert of claim 11, further comprising first and second end flanges to prevent axial movement of the cushion insert relative to the clamp halves.

13. The cushion insert of claim 11, wherein the spacer can locate the rotational position of the cushion insert relative to the channel.

14. The cushion insert of claim 11, further comprising a planar portion located on a single half of a base for locating the rotational position of the cushion insert relative to the channel.

15. The cushion insert of claim 14, wherein the second cushion half has a single corner where the planar portion ends, the single corner being disposed along the second cushion half adjacent the groove and opposite the gap to assist in locating the cushion insert relative to the channel without hindering rotation of the cushion insert about the cylindrical member.

16. The cushion insert of claim 11, wherein the groove provides a flexure means for the first cushion half and the second cushion half.

17. The cushion insert of claim 11, further comprising a recess in at least one of the spacer, second cushion half, and tab.

18. A method of replacing a cushion insert adapted to be disposed on a channel and about a cylindrical member, comprising:
removing an old cushion insert from about the cylindrical member;
expanding a first cushion half and a second cushion half of a new cushion insert to wrap around the cylindrical member;
rotating the new cushion insert around an axis running axially through the center of the cylindrical member to align a base portion of the new cushion insert with the channel and to align an integral spacer of the new cushion insert between first and second clamp halves;
feeding a fastener through a passage in the first and second clamp halves and the spacer; and
tightening the fastener such that the first and second clamp halves exert force on the cylindrical member through the cushion insert preventing axial and rotational movement of the cylindrical member in relation to the cushion insert and the channel.

19. The method of claim 18, wherein the first and second clamp halves contact the spacer when the fastener is tightened to a pre-determined threshold such that the spacer prevents excessive tightening of the fastener and prevents damage to the first and second clamp halves and the cylindrical member.

* * * * *